United States Patent [19]
Kitayama et al.

[11] Patent Number: 5,654,057
[45] Date of Patent: Aug. 5, 1997

[54] SHEET GLASS FLATTENING METHOD, METHOD OF MANUFACTURING GLASS SUBSTRATE FOR AN INFORMATION RECORDING DISK USING FLATTENED GLASS, METHOD OF MANUFACTURING A MAGNETIC RECORDING DISK USING GLASS SUBSTRATE, AND MAGNETIC RECORDING MEDIUM

[75] Inventors: Teruki Kitayama, Oume; Kazuhiko Sekiguchi, Akishima; Teruhisa Fujita; Yoshio Murano, both of Akigawa; Sakuji Yoshihara, Mizuho-machi; Takeshi Kojima, Yamanashi-ken, all of Japan

[73] Assignee: Hoya Corporation, Japan

[21] Appl. No.: 579,319

[22] Filed: Dec. 27, 1995

[30] Foreign Application Priority Data

| Dec. 28, 1994 | [JP] | Japan | 6-339069 |
| Jul. 4, 1995 | [JP] | Japan | 7-191259 |
| Oct. 31, 1995 | [JP] | Japan | 7-306822 |
| Oct. 31, 1995 | [JP] | Japan | 7-306823 |

[51] Int. Cl.$^6$ ..................... B32B 3/00
[52] U.S. Cl. ............. 428/64.1; 428/64.2; 428/64.4; 428/410; 428/426; 428/915; 430/290.11; 430/495.1; 430/945; 430/270.1; 369/288
[58] Field of Search ............. 428/64.1, 64.2, 428/64.4, 410, 426, 913; 430/270.1, 270.11, 495.1, 945; 369/288

[56] References Cited

U.S. PATENT DOCUMENTS

| 4,786,325 | 11/1988 | Melard et al. | 106/3 |
| 5,277,946 | 1/1994 | Nagai et al. | 428/426 |
| 5,569,518 | 10/1996 | Hayashi | 428/141 |

*Primary Examiner*—Patrick Ryan
*Assistant Examiner*—Elizabeth Evans
*Attorney, Agent, or Firm*—Edward D. Manzo; Mark J. Murphy

[57] ABSTRACT

A glass substrate manufacturing method advantageously applicable to magnetic recording disk glass substrates, LCD glass substrates, photomask glass substrates, or optical memory glass substrates. This method includes the steps of forming a film of a solution on at least a principal surface of a sheet glass formed using a down-drawing method, the solution containing a water soluble inorganic material and a surface-active agent; sandwiching both sides of a single sheet glass on which the film is formed or of a laminated structure of plural sheet glasses with a densified sheet with a high flatness to pressure the single glass or laminated structure; and heating and annealing the single sheet glass or laminated structure to flatten the same. The end side of the flatten glass substrate is treated with a treating solution containing a hydrofluosilicic acid. The glass substrate is formed by chemically strengthen a glass substrate by immersing the glass substrate in a chemical reinforcement solution heated and then ion exchanging ions on the surface-layer of the glass substrate with ions in the chemical reinforcement solution; pulling up the substrate from the chemical reinforcement solution and then annealing it to a temperature higher than the crystallization temperature of a molten salt; annealing the glass substrate at a rate at which the crystallization of the molten salt is deposited on the surface of the glass substrate; and then cleaning the surface of the glass substrate. Moreover, the glass substrate is formed by chemically strengthen a glass substrate by immersing the glass substrate in a chemical reinforcement solution heated and then ion exchanging ions on the surface layer of the glass substrate with ions in the chemical reinforcement solution; and pulling up the substrate from the chemical reinforcement solution and then cleaning the surface of the glass substrate with a cleaning agent containing acid.

19 Claims, 2 Drawing Sheets

|  | BEFORE ANNEALING | AFTER ANNEALING |
|---|---|---|
| DATUM LENGTH a (mm) | 300 | 70 |
| WARPAGE AND DEFLECTION AMOUNT b (mm) | 0.3 ~ 1.5 | 0.02 ~ 0.03 |
| WARPAGE AND DEFLECTION RATE (b/a)(%) | 0.1 ~ 0.5 | 0.028 ~ 0.042 |

FIG. 6

SHEET GLASS FLATTENING METHOD, METHOD OF MANUFACTURING GLASS SUBSTRATE FOR AN INFORMATION RECORDING DISK USING FLATTENED GLASS, METHOD OF MANUFACTURING A MAGNETIC RECORDING DISK USING GLASS SUBSTRATE, AND MAGNETIC RECORDING MEDIUM

REFERENCE TO RELATED APPLICATION

This application claims the priority right under 35 U.S.C 119, of Japanese Patent Application No. Hei 06-339069 filed on Dec. 28, 1994, No. Hei 07-191259 filed on Jul. 7, 1995, No. Hei 07-306822 filed on Oct. 31, 1995, and No. Hei 07-306823 filed on Oct. 31, 1995, the entire disclosure of which is incorporated herein by reference.

BACKGROUND OF THE INVENTION

1. Field of the Invention

The present invention relates to a sheet glass flattening method, a method of manufacturing products using a glass substrate produced using the flattening method, and the products. The present invention relates more particularly to a method of manufacturing glass substrate for an information recording disk used for hard disks, optical recording medium, and similar things, and a glass substrate technique applicable advantageously to magnetic recording disks and the like manufactured by the above-mentioned manufacturing method.

2. Description of the Related Art

Conventionally, thin glass substrates have been used as substrates used for magnetic recording disks (hard disks), optical disks, liquid crystal displays, and the like. Recently, glass substrates have been noted because they have excellent characteristics such as higher flatness and sheet thinning capability, compared with other resin substrates and metal substrates.

Usually, the thin glass substrate is prepared by processing a sheet glass blank obtained by fabrication such as the down-drawing method (fusion method) or floating method to a predetermined dimension and then abrading the surface of the result.

The down-drawing method is generally a method of manufacturing a sheet glass by drawing down molten glass and then pulling down vertically the same. In more detail, for example, the method (an example of the down-drawing method) is known by which molten glass is run down along the front and back surfaces of a molding body with a wedged cross section and then joined at the lower portion of the molding body in a sheet form, and the sheet is cooled and solidified by pulling down it with a pulling roller to produce a sheet glass (Japanese Unexamined Patent publication (Tokkai-Hei) No. 5-163032 or U.S. Pat. No. 3,338,696).

A sheet glass produced by the down-drawing method is thinner than that produced by other methods and is used as a thin glass substrate for magnetic recording disks and a thin glass substrate for liquid crystal displays. However, because of the characteristic of the forming method, the flatness of the sheet is degraded compared with the sheet glass produced by the floating method. For that reason, where the thin film glass produced by the down-drawing method is used for the above-mentioned applications, heat treatment (heating and annealing) is needed to correct and improve the flatness.

Figure 1A:
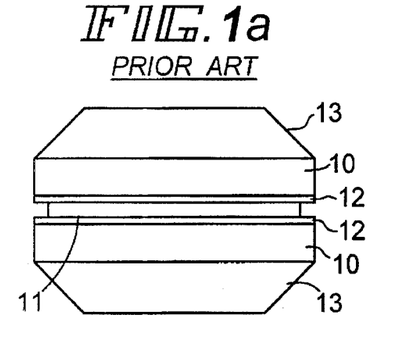
FIG. 1(a) is a front view for explaining a prior art treating method and FIG. 1(b) is a side view for explaining a prior art treating method.
Figure 1B:
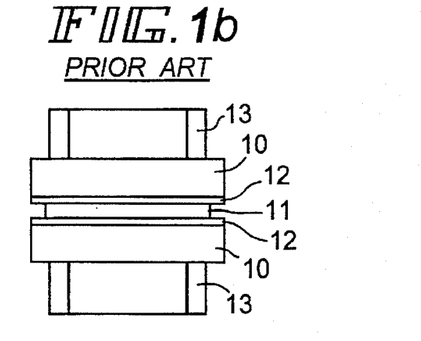

In the method, as shown in concrete in FIGS. 1(a) and 1(b), the heating and annealing are carried out with thin glass substrates 1 sandwiched between cut and polished densified sheets (thick flatness correcting aluminum sheet) 10 and with a paper or carbon paper 12 acting as a lubricant inserted between either surface of the thin glass substrates 11 laminated and the densified sheet 10. Numeral 13 represents a fin for preventing the densified sheet to be deformed.

With plural thin glass sheets laminated to increase the efficiency, when the heat treatment is treated without any consideration, the plural glass sheets are thermally bonded together, thus completely being damaged in use. Hence it is needed to prevent the thin glass sheets from being bonded together. To overcome this problem, there is the method which-inserts a paper or carbon paper between thin glass sheets and utilizes paper cinders, or method which utilizes a carbon paper acting as a lubricant (Japanese Unexamined Patent Publication (Tokkai-hei) No. 6-247730).

In the method in which a paper is sandwiched between thin glass sheets, as the number of laminated thin glass layers increases, the accuracy of flatness cannot be accomplished to a desired value because of the paper's thickness and elasticity, and labor is needed in handling and cleaning cinders. In more detail explanation, in the paper sandwiched between thin glass sheets, its peripheral portion is burnt out but its center portion remains carbonized due to oxygen shortage so that a difference in thickness occurs between the peripheral portion and the center portion of the thin glass sheet. The thickness is increased by the laminated value, and the flatness becomes poor due to the increased thickness transferred onto the thin glass sheet. This results in insufficient satisfaction to a required accuracy. Moreover, when the thin sheet glass is taken out of a heating furnace after the thermal treatment, paper cinders may be scattered around, thus worsening the working environment. Thus the handling is troublesome. Moreover, a tar component from the paper adhered on the surface of the thin glass sheet causes troublesome and labor for cleaning.

In the method in which a carbon paper is sandwiched between thin glass sheets, the thickness and elasticity of a carbon paper make it difficult to set the accuracy of flatness to a desired value and the costly carbon paper causes an increase in cost. In more detail, since the carbon paper with a thickness of 0.5 mm or more is thicker than paper, the elasticity absorbs the flatness of the sheet glass. As a result, the insufficient correction of the flatness causes the improved flatness accuracy. The carbon paper also leads to higher costs because of its insufficient strength and its brittleness.

In order to avoid the above-mentioned problems, it may be considered that fine powders of an inorganic material is used as the lubricant. In this case, it is difficult to scatter (coat) uniformly the fine powders over the surface of a thin glass sheet, and the fine powders are scattered, thus worsening the working environment. Moreover, since the fine powders fuse on the surface of a thin glass sheet or hurt the surface thereof, they deteriorate the abrasion property of the thin glass sheet to an unusable state.

In addition, when paper or carbon paper is inserted between thin glass sheets, dusts in air are involved. This causes flaws due to rubbing, thus resulting in a decrease in yield.

Because of such problems, it has been difficult to treat efficiently and thermally plural thin glass sheets laminated with the flatness of a required accuracy, without producing flaws and foreign matter bonding.

For that reason, at the cost of the efficiency, a heat treatment is performed with thin glass sheets respectively sandwiched between densified sheets with good flatness to secure the flatness of a required accuracy, or at the cost of the accuracy, a heat treatment is performed with paper or carbon paper sandwiched between thin glass sheets. Hence the cinders is troublesome while cleaning is unavoidable.

In the conventional sheet glass flattening method, it has been difficult to prevent thin glass sheets laminated from being bonded and to obtain the flatness with a required accuracy by treating efficiently and thermally with plural thin glass sheets laminated, without producing flaws and foreign matter bonding.

There has been a problem in that a conventional glass substrate is costly because the flatness with an accuracy required at the cost of the efficiency must be secured, or because a thin glass sheet prepared at the cost of the accuracy requires a considerable polishing to secure the flatness of a required accuracy uses.

Many aluminum substrate have been used as the substrate for magnetic recording disks. However, with the demands for small-sized and thinned magnetic recording disks and low-floating of a magnetic head, glass substrates have been used at an increasing use rate because small-sizing and thinning, high flatness, and low floating over a magnetic recording disk are easily realized, compared with aluminum substrate.

However, a magnetic recording disk glass substrate of that kind is costly and the surface condition of the substrate is poor because flaws unremovable in the polishing step and foreign matter bonding are left on the substrate. Hence, there has been a problem in that the head crush occurs when the substrate is used for a magnetic recording disk, or defects occur in a film such as a magnetic layer, thus causing an error.

Where a glass substrate is used as a magnetic recording disk substrate, the surface of the glass substrate is generally subjected to a chemical strengthening process by the low-temperature ion exchanging method to improve the shock resistance and Vibration resistance.

This chemical strengthen is made after cutting and polishing the glass substrate. There is a substrate cleaning step as the step prior to the chemical reinforcement process. This cleaning step is carried out with pure water, as described in Japanese Unexamined Patent Publication (Tokkai-Hei) No. 2-285508.

Conventionally, the polishing is made to the front and back surfaces of a glass substrate, but is not made to the outer peripheral end surface and inner peripheral end surface. Since these ends have rough surfaces, dusts may occur from the ends unintentionally rubbed when the glass substrate is carried, or stored into or taken out of a housing case.

Recently, the slight dusting causes problems with the high density magnetic recording disks It is possible to polish the end surfaces. However, this leads to a high cost because it is difficult to polish the end surface to the surface roughness with which dusting can be prevented. In addition, it is possible to polish to etch chemically the ends. However, the strong etching effect may make it difficult to obtain end surfaces with good surface roughness. Particularly, in the case of the glass substrate used for magnetic recording disks, the roundness is impaired through the etching process so that the center deviation results in rejected products. The strong etching effect may reversely deteriorate the surface roughness of the end surface.

Moreover, where the glass substrate is used as a magnetic recording disk substrate, the surface of the glass substrate is generally subjected to a chemical strengthening process by the low-temperature ion exchanging method to prevent the substrate breakage due to shock or vibration to improve the shock resistance and vibration resistance.

The method disclosed in Japanese Unexamined Patent Publication (Tokkai-Hei) No. 5-32431 is known as a method of manufacturing a magnetic recording disk using that kind of chemical reinforced glass substrate. According to the method described in the publication, the glass substrate is reinforced by immersing into a mixed solution of potassium nitrate and sodium nitrate at 400° C., and an underlayer and a magnetic layer are successively formed on the chemical reinforced glass substrate.

However, as described in the conventional method, in the magnetic recording disk which is manufactured by pulling up a glass substrate from the chemical reinforcement solution, cleaning it, and then successively forming an underlayer and a magnetic layer on the glass substrate, there is a disadvantage in that abnormal protrusions sometimes occur on the surface of a magnetic recording disk. As described above, the abnormal protrusions formed on the surface of a magnetic recording disk may cause the head crush to a magnetic head so that the magnetic recording disk cannot be used as a product.

Since molten salt is adhered with the glass substrate after the chemical strengthening process, cleaning is required. Conventionally, Japanese Unexamined Patent Publication (Tokkai-Hei) No. 2-285508, for example, discloses a magnetic recording disk glass substrate after the chemical reinforcement process is cleaned using alkaline cleaning agent, pure water, and organic cleaning agent.

With the high recording density of a magnetic recording disk, it has been required to decrease the distance (spacing) between the magnetic recording disk and the magnetic head. Hence, the current problem is to remove completely the foreign matters on a glass substrate causing protrusions formed on the surface of a magnetic recording disk.

However, the above-described conventional cleaning method can provide a cleaning effect to some extent. Particularly, it has been difficult to remove completely molten salt left on the glass substrate even if the glass substrate is cleaned after being pulled up from the chemical reinforcement solution.

SUMMARY OF THE INVENTION

In order to overcome the above mentioned problems, a first object of the present invention to provide a method of flattening sheet glass wherein the thermal bonding between laminate thin sheet glass films can be prevented while plural laminated sheets of thin glass can be thermally treated effectively with a required accuracy of flatness without occurring any flaw and foreign matter welding.

A second object of the present invention is to provide a thin sheet glass substrate with high flatness and at low price.

A third object of the present invention is to provide a magnetic recording medium which does not cause any head crush and has a defect-free film or magnetic layer.

A fourth object of the present invention is to provide a method of manufacturing glass substrate for an information recording disk which can prevent the glass end surface from dusting, without impairing the roundness and deteriorating the surface roughness at the end surface.

A fifth object of the present invention is to provide a method of manufacturing a magnetic recording disk which can be designed so as to remove a defect due to dust from the glass end, to improve the product quality, and to reduce a defect occurrence during using a product.

A sixth object of the present invention is to provide a method of manufacturing an information glass substrate with no abnormal protrusions and a method of manufacturing a magnetic recording disk with no abnormal protrusions.

A seventh object of the present invention is to provide glass substrate for an information recording disk manufacturing method and a magnetic recording disk manufacturing method each of which can remove effectively deposited molten salt without damaging a glass substrate.

According to the present invention, a sheet glass flattening method comprises the steps of forming a film of a solution on at least a principal surface of a sheet glass formed using a down-drawing method, the solution containing a water soluble inorganic material and a surface-active agent; sandwiching both sides of a single sheet glass on which the film is formed or of a laminated structure of plural sheet glasses with a densified sheet with a high flatness to pressure the single glass or laminated structure; and heating and annealing the single sheet glass or laminated structure to flatten the same.

Glass substrate for an information recording disk manufacturing method comprises the step of treating at least end side of a glass substrate with a treating solution containing a hydrofluosilicic acid.

A magnetic recording disk manufacturing method comprises the step of applying the manufacturing method defined by claim 6 to a disklike glass substrate; and then forming at least a magnetic layer on glass substrate for an information recording disk.

A magnetic recording disk manufacturing method comprises the step of sand-blasting and polishing at least a disklike glass substrate; then treating the whole glass substrate with a treating solution containing a hydrofluosilicic acid; and then forming at least a magnetic layer on glass substrate for an information recording disk.

Glass substrate for an information recording disk manufacturing method comprises the step of chemically strengthen a glass substrate by immersing the glass substrate in a chemical reinforcement solution heated and then ion exchanging ions on the surface layer of the glass substrate with ions in the chemical reinforcement solution; pulling up the substrate from the chemical reinforcement solution and then annealing it to a temperature higher than the crystallization temperature of a molten salt; annealing the glass substrate at a rate at which the crystallization of the molten salt is deposited on the surface of the glass substrate; and then cleaning the surface of the glass substrate.

A magnetic recording disk manufacturing method comprises the steps of chemically strengthen a glass substrate by immersing the glass substrate in a chemical reinforcement solution heated and then ion exchanging ions on the surface layer of the glass substrate with ions in the chemical reinforcement solution; pulling up said substrate from the chemical reinforcement solution and then annealing it to a temperature higher than the crystallization temperature of a molten salt; annealing the glass substrate at a rate at which the crystallization of the molten salt is deposited on the surface of the glass substrate; cleaning the surface of the glass substrate; and then forming at least a magnetic layer on the substrate.

Glass substrate for an information recording disk manufacturing method comprises the steps of chemically strengthen a glass substrate by immersing the glass substrate in a chemical reinforcement solution heated and then ion exchanging ions on the surface layer of the glass substrate with ions in the chemical reinforcement solution; and pulling up the substrate from the chemical reinforcement solution and then cleaning the surface of the glass substrate with a cleaning agent containing acid.

A magnetic recording disk manufacturing method comprises the step of chemically strengthen a glass substrate by immersing the glass substrate in a chemical reinforcement solution heated and then ion exchanging ions on the surface layer of the glass substrate with ions in the chemical reinforcement solution; cleaning the surface of the glass substrate pulled up from the chemical reinforcement solution with a cleaning agent containing acid; and then cleaning the surface of the glass substrate.

According to the first aspect of the present invention, a water-soluble inorganic material can be coated thin and uniformly on the glass surface by adding a surface-active agent into an aqueous solution. The use of a solution including a surface-active agent and a water-soluble inorganic maternal allows an inorganic material coating which prevents glass from being thermal bonded to be formed (to several microns in thickness) such that correcting the flatness of a sheet glass is not disturbed. With no addition of the surface-active agent, it is difficult to form uniformly and smoothly a thin film. The solution which does not include the water-soluble inorganic material does not provide a film which can prevent glass from thermal bonding.

According to the second aspect of the present invention, since the ends of a glass substrate is treated with hydrofluosilicic acid, the surface roughness of the ends of the glass substrate is improved. Hence dusting from the glass end surface can be prevented. The etching effect of the hydrofluosilicic acid not very strong can improve the end surface of a glass substrate to have a good surface roughness (Rmax less than 2 μm) at which dusting can be prevented, and does not deteriorate the roundness of the glass substrate. Furthermore, where the whole glass substrate is treated with a hydrofluosilicic acid, flaws caused by polishing and cutting the surface of a glass substrate can be decreased.

In the magnetic recording disk manufacturing method according to the second aspect of the present invention, adhesion of foreign matters due to dusting as well as flaws due to polishing and cutting the surface of a glass substrate can be reduced. Hence high-quality magnetic recording disks with a small number of flaws can be manufactured at high yield.

According to the third aspect of the present invention, the deposit molten salt adhered to the glass substrate can be weakened by quickly cooling a glass substrate pulled up from the chemical reinforcement solution, and can be easily removed a deposit molten salt by cleaning. Hence a magnetic recording disk glass substrate with no abnormal protrusions can be manufactured. Since the glass substrate contained in a holding means holding with the end surfaces thereof is immersed into a chemical reinforcement solution, a deposit molten salt produced between the end surface of a glass substrate and the holding member is weakened. Hence, the end surface of a glass substrate can be prevented from being unintentionally broken when the glass substrate is taken out of the holding member. Moreover, since the chemically reinforced glass substrate has a compressive stress in the surface thereof and internally a tensile stress, possible fine flaws in the surface cause breakage of the glass substrate due to the cooling step. Hence defective substrates can be easily distinguished.

According to the magnetic recording disk manufacturing method of the third aspect of the present invention, since a magnetic recording disk glass substrate with no abnormal protrusions and fine flaws in the surface thereof is used, a high-quality magnetic recording disk of which the number of defects due to abnormal protrusions and fine flaws are small can be manufactured at higher yield.

According to the fourth aspect of the present invention, the glass substrate pulled up from the chemical reinforcement solution is cleaned with a cleaning agent including a sulfuric acid and/or phosphoric acid. Hence the deposit molten salt can be effectively removed without damaging the glass substrate.

According to the magnetic recording disk manufacturing method of the fourth aspect of the present invention, the deposit molten salt is completely removed and a magnetic recording disk glass substrate with no minute flaws in the surface due to breakage of a glass substrate is used. Hence high-quality magnetic recording disks with less defects can be manufactured at high yield.

DESCRIPTION OF THE PREFERRED EMBODIMENTS

A sheet glass flattening method and a magnetic recording medium manufactured using a flattened glass substrate flattened by the before-mentioned method according to the first embodiment will be explained in detail hereunder.

According to the first embodiment, a laminate structure of a sole or plural sheet glass substrates which are formed by the down-drawing method is sandwiched between densified sheets each with high flatness. Each sheet glass is flattened by heating under pressure and then annealing.

The sheet glass formed by the down-drawing method may be a sheet glass formed either by the conventionally-known down-drawing method including detail manufacturing requirements, or by a sheet glass with a shape equivalent to that of a sheet glass formed by the down-drawing method.

The sheet glass is not particularly limited in material, size, thickness, or the like. As the material of a sheet glass are listed aluminosilicate glass, soda-aluminosilicate glass, soda-lime glass, chain-silicate glass, and the like.

The number of sheet glass substrates laminated is preferably 2 to 50, in view of the thermal conductivity of glass. The sheet glass substrates can be separately subjected to a flattening process, without laminating them.

A material with a heat resistance and high conductivity is preferably used as the material of a densified sheet with high flatness, for example, including SiC, carbon sheet, a metal sheet such as aluminum, or the like. A quartz sheet, heat-resistant glass, or the like with low thermal conductivity may be used. In this case, it is necessary to slope gently the annealing schedule. This corresponds to prolonging the annealing time.

It is preferable that the surface flatness of the glass sheet in contact with the densified sheet is higher than that of the glass sheet. For example, it is preferable that the flatness is less than 10 μm by cutting and polishing the surface. Moreover, it is desirable that the densified sheet is thickened to maintain the flatness, thus preventing the deformation thereof. For example, it is desirable to be more than 10 mm for a SiC sheet, more than 15 mm for a carbon sheet, and more than 20 mm for an aluminum sheet. A fin may be arranged on the back surface of the densified sheet to prevent the deformation of the densified sheet.

In order to impose on a sheet glass, a densified sheet, a laminated sheet glass and a compressed sheet, for example, are piled in order, Then a loading sheet of a predetermined weight may be placed on the laminated structure.

In order to execute the heating and annealing process, the heating temperature and heating time of the heating furnace are controlled to follow a predetermined heating and annealing schedule (temperature rising, temperature retaining, annealing, cooling) corresponding to a glass material. In this case, the heating temperature is necessary to be a temperature more than the distortion spot of glass. It is desirable to set the heating temperature to a temperature higher than the transition temperature of glass. The retention time is a time during which the load of a glass are sufficiently corrected by deforming the glass using the flatness of a densified sheet and a load and by uniforming the whole structure.

In the first embodiment, it is characterized that a solution including a water-soluble inorganic material and a surface-active agent over at least one surface of a sheet glass substrate to flatten plural sheet glass substrates laminated.

In this case, there is at least one coating surface in each interface in the sheet glass substrates laminated. The coating surface intervenes between the densified sheet and the sheet glass. Needless to say, a solution including a water-soluble inorganic material and a surface-active agent may be applied on each surface (or surfaces) of each of the sheet glass substrates laminated.

As a water-soluble inorganic material may be listed alkali hydroxide group (NaOH, KOH, etc.), alkaline earth hydroxide group (Ba(OH)2, Ca(OH)2, etc.), alkali (Na2SO4, organic alkali, etc.), sulfate such as ammonium sulfate, alkyl-ether ammonium sulfate, or the like, alkyd compounds, chelate compounds, and the like. These water-soluble inorganic materials may be used a sole kind of chemical or a compound of two kinds or more of chemicals.

The surface-active agent may be an agent improving the wetting to glass and forming a thin film uniformly and evenly. The kind of surface-active agent is not specially restricted in use.

When a water-soluble solution is coated unevenly, the portion causes thermally-bonded glass. The surface-active agent reacts with oxygen in air during a heating process to produce carbon dioxide. The carbon dioxide reacts with alkali, alkaline earth, or the like added in the solution to produce carbonate, so that a cabonate film is formed on the glass surface. As a result, it is prevented that glass is thermally bonded.

Where ammonium sulfate is added into a water-soluble solution containing a surface-active agent, the ammonium sulfate added to the glass surface reacts with the sodium included in a glass component during a heating treatment so that a minute (dense) film of sodium sulfate is formed on the glass surface. Thus it is prevented that glass is thermally bonded.

The carbonate film and the sodium sulfate film can be easily washed away and removed after the heating treatment.

As the surface-active agent are listed an ionic surface-active agent such as anionic surface-active agent, cationic surface-active agent, amhoteric surface-active agent, or the like, and nonionic surface-active agent. These surface-active agents may be used singly or in a mixture of two kinds or more of agents.

The addition ratio of the surface-active agent and the water-soluble inorganic material is adjusted so as to form thinly and evenly a thermal-bonding prevention film on a glass surface. Other component such as alcohol, boron nitride, or the like may be further added to the solution including a water-soluble inorganic material and a surface-active agent.

The method of coating a solution including a water-soluble inorganic material and a surface-active agent on the surface of each sheet glass is not specially limited. However, for example, the solution may be coated using a spray gun, or a sponge soaked with a solution. In addition, the solution may be coated by immersing a sheet glass.

It is preferable to adjust the coating thickness of solution to a value at which the correction is not disturbed, in concrete, to several microns.

The sheet glass flattening method according to the first embodiment is preferably utilized to manufacture glass substrates for magnetic recording disks or glass substrates for LCDs (to be described later). However, the present invention should not be limited only to this embodiment. This invention also is applicable to flatten the surfaces of glass substrates for photomasks or optical disks, or other conventional glass sheets.

Next, explanation will be made below as to a glass sheet manufactured using the sheet glass flattening method according to the first embodiment.

A glass sheet is usually subjected to cutting and forming in predetermined size and shape, bevelling, surface polishing, surface-chemical strengthening, and the like, to form various glass substrates.

The sheet glass manufactured using the sheet glass flattening method can be used as various glass substrates requiring a high-surface smoothness through a simple polishing step or no polishing step. Therefore, the sheet glass can be manufactured at very low cost, compared with the conventional sheet glass.

In concrete, the magnetic recording disk substrate has been conventionally manufactured by polishing a 3 mm or more thick glass sheet by 2 mm because it is difficult to fabricate a magnetic recording disk sheet using a thin glass substrate. However, the magnetic recording disk glass substrate can be formed merely by cutting and processing a thin glass manufactured by the sheet glass flattening method in predetermined size and shape and then slightly polishing the surface thereof. Hence the magnetic recording disk substrate is excellent and can be manufactured at a very low cost.

If a thin glass prepared using the above-described sheet glass flattening method is adjusted to a predetermined size and shape, an LCD glass substrate can be manufactured excellently and at very low cost merely by surface-polishing it without cutting.

Figure 5:
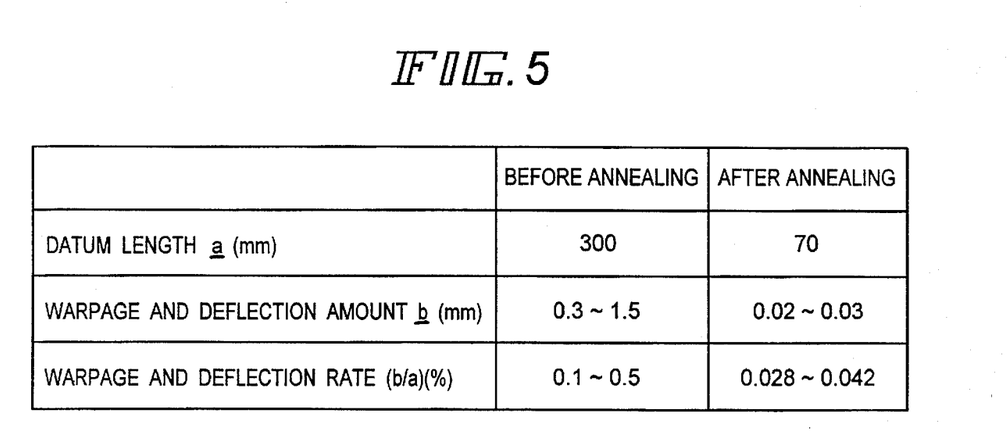
FIG. 5 is data obtained by the flattening process according to an aspect of the present embodiment.
Figure 6:
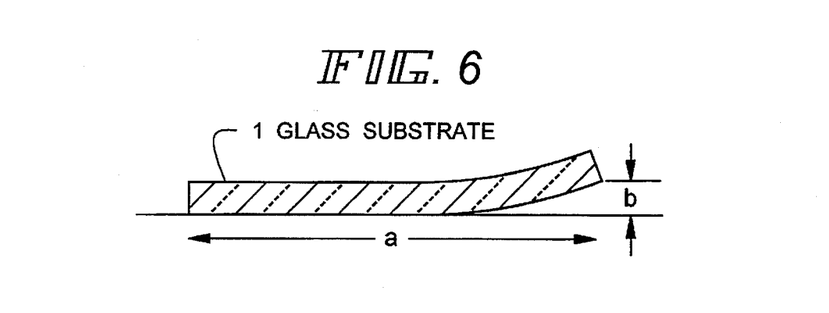
FIG. 6 is an explanatory diagram used for explaining the data shown in FIG. 5.

FIG. 5 is data showing warpage and deflection improved by the flattening process according to an aspect of the present embodiment. FIG. 6 is an explanatory diagram showing the state where warpage and deflection occur in the glass substrate 1, and shows a corresponding to the datum length a in FIG. 5 and b corresponding to the warpage and deflection amount b in FIG. 5.

Next another example according to the first embodiment will be explained below.

According to another example of the first embodiment, the magnetic recording medium is characterized by the steps of polishing the principal surface of a sheet glass subjected to the sheet glass flattening method, thereafter chemically strengthen the result through an ion exchanging step, and then forming at least a magnetic layer.

In comparison with the conventional sheet glass, the sheet glass subjected to the sheet glass flattening method has its excellent flatness and excellent surface condition. Therefore, since flaws (marks) and bonded foreign matters which are unremovable in the polishing step do not remain on the substrate, the surface remains in good condition. The good surface condition does not cause the head crush of a completed magnetic recording disk as well as an error due to a defect formed in a layer such as a magnetic layer.

The magnetic recording medium according to the second embodiment is manufactured using the above-described inexpensive glass substrate. Since the polishing step can be further simplified, the magnetic recording medium can be priced to a very low value, compared with the conventional one. In concrete, compared with the use of the magnetic recording disk substrate manufactured by polishing a 3 mm- or more thick glass sheet by about 2 mm, a magnetic recording disk substrate of less than 1 mm thick can be obtained by slightly polishing a glass sheet of 1 mm or more thick so that the short polishing time results in a decrease in cost.

The magnetic recording medium which has usually a predetermined flatness and surface roughness is formed by sequentially laminating an underlayer, a magnetic layer, a protection layer, and a lubricant layer on a magnetic recording disk glass substrate of which the surface is chemically reinforced.

In the magnetic recording medium, nonmagnetic thin films such as Cr, Mo, Ta, Ti, W, and Al are listed as the underlayer. The underlayer may be formed of a multi-underlayer including Al/Cr/CrMo, Al/Cr/Cr, or the like.

As the magnetic layer is listed a magnetic thin film including CoPtCr, CoNiCrTa, or the like, in addition to Co acting as a major component. The magnetic layer may be formed of a multi-layer structure such as CoPtCr/CrMo (or CrV)/CoPtCr which is designed to reduce noises with non-magnetic layers divided.

As the protection layer are listed, for example, a Cr film, a Cr alloy film, a carbon film, a zirconia film, a silica film, and the like. These protection films can be sequentially formed by in-line-type sputtering apparatus, together with the underlayer and magnetic layer. These protection films may be formed singly or a multilayer structure of different kinds of films.

Another protection layer may be more formed on the above-mentioned protection layer. For example, a tetra-alkoxysilane diluted with a solvent of alcohol series is coated on the protection layer and then a sintered silicon oxide ($SiO_2$) may be further formed on the resultant structure.

The lubricant layer is generally formed by diluting a perfluoropolyether (PFPE) acting as a liquid lubricant with a solvent such as a Freon series, then coating the result on the medium surface by the dipping method, spin-coating method, or spraying method, and, if necessary, thermally heating it.

[First Example]

The first embodiment will be explained below in more detail according to concrete examples Example 1-1

Figure 2:
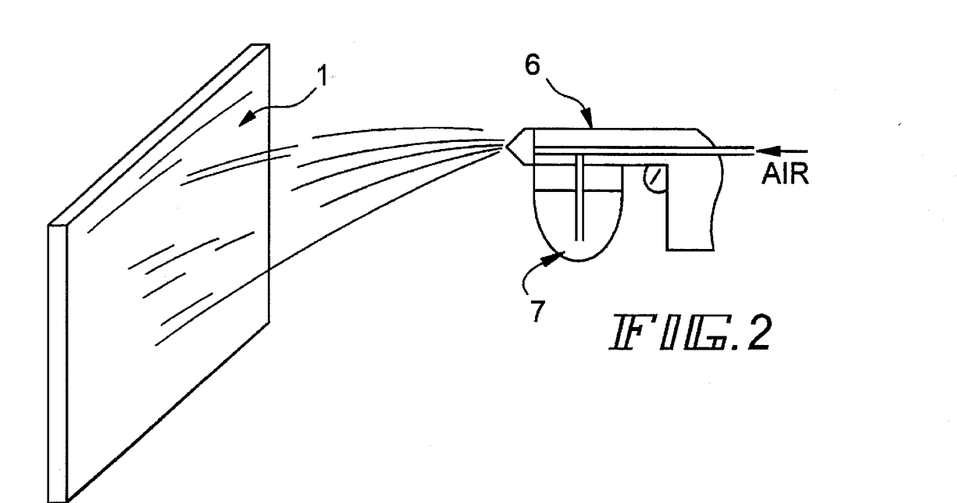
FIG. 2 is an explanatory view illustrating an embodiment of an aqueous solution coating step in a sheet glass flattening method according to the present invention.

30% of a caustic soda (NaOH) is dissolved into an aqueous solution into which 10% of a commercially-available surface-active agent is added. The aqueous solution 7, as shown in FIG. 2, is lightly coated (2 μm) on the surface of a sheet glass (of an aluminosilicate glass) 1 using a spray gun 6.

Figure 3:
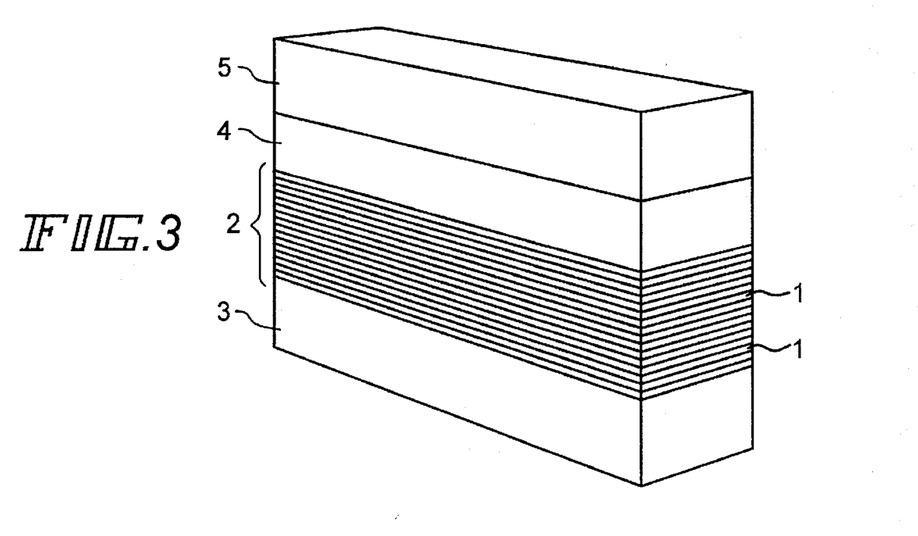
FIG. 3 is an explanatory view illustrating an embodiment of the glass flattening method according to the present invention.

Next, as shown in FIG. 3, 15 sheet glass substrates 1 coated with aqueous solution laminated, or the laminated sheet glass (group) 2, is placed on a SiC thick sheet 3 (of 25 mm thick) which has the cut and polished surface with the flatness of less than 10 μm. Moreover, a SiC thick sheet 4 (of 25 mm thick) having the same flatness as the thick sheet 3 is placed on the laminated sheet glass 2 lying on the thick sheet 3. A steel member 5 of 30 kg is placed on the thick sheet 4 to impose a load.

Figure 4:
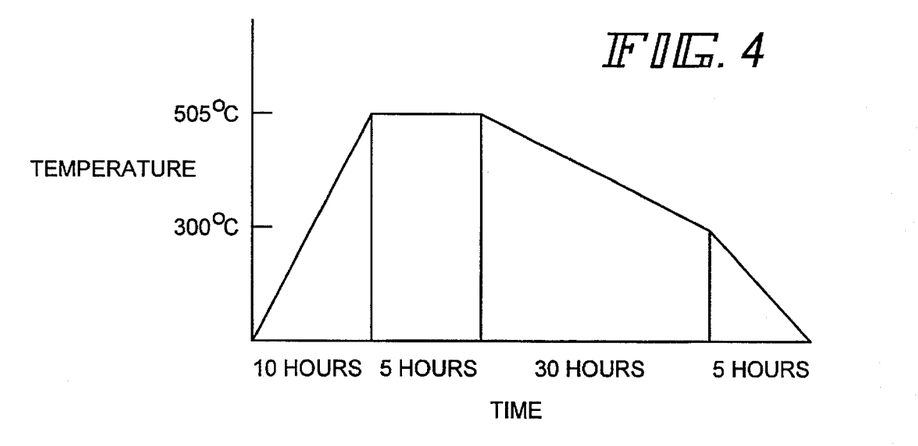
FIG. 4 is the heating and annealing schedules in an embodiment of the glass flattening method according to the present invention.

A sheet glass flattening process is performed by heating and annealing the laminated sheet glass 2 set as described above according to the annealing schedule as shown in FIG. 4.

The glass sheet is sufficiently cooled through annealing and then is taken out of a furnace. The surface of the glass sheet is covered with a white film of a carbonate changed from alkali. Hence the glass sheets are not thermally bonded each other. The white film can be easily removed by washing without marking the glass surface.

As a result, a 300×300×1.1 mm sheet glass has its flatness of 50 μm or less. Each of 66 mm ⌀ magnetic recording disk substrates obtained by cutting the sheet glass has a flatness of 5 μm or less (2 μm or less in average).

The glass transition point of the sheet glass used is 500° C. Heating at a temperature of 500° C. or more is sufficient to obtain the above-mentioned result. It is necessary to hold the retention time for 5 hours to uniform the whole structure. The flattening temperature must be over the distortion temperature. It is necessary to heat the glass at 400° C. or more. The retention temperature must be prolonged at a temperature of less than 500° C. It is necessary to prolong the retention time to 10 hours at a heating temperature of 450° C.

Comparison Example in the First Embodiment

The sheet glass flattening process is performed similarly to the example 1-1, except that a paper (interleaving paper) is inserted between glass sheets, without coating an aqueous solution on the glass substrate. At a result, a 300×300×1.1 mm sheet glass with a flatness of 150 μm or less was obtained. Each of 66 mm ⌀ magnetic recording disk substrates obtained by cutting the sheet glass has a flatness of 15 μm or less (8 μm or less in average).

A considerable period of time is needed to obtain an LCD glass substrate by polishing the 300×300×1.1 mm sheet glass. Since the LCD glass substrate was thin and large, some were broken during the polishing process. It is difficult to manufacture a magnetic recording disk glass substrate by polishing a 1.1 mm thin glass because the flatness is worsened fairly.

As apparent from the above-mentioned embodiment 1-1 and the comparison example 1-1, according to the sheet glass fattening method according to the first embodiment, a considerable high flatness and surface condition are obtained, in comparison with the conventional method. Because of the easy cleaning process, the previous steps reaching the polishing step can be shortened and the production efficiency can be improved. Furthermore, since no flaws are formed by involving dusts in the air when a paper is inserted, the yield is improved so that the cost reduction can be realized.

Examples 1-2 to 1-3

A sheet glass flattening process is carried out similar to the example 1, except that a caustic potash (KOH) (Example 1-2) and an alkyl acid ether sodium sulfate (Example 1-3) are used instead of caustic soda as a water soluble inorganic material. The result is almost similar to that in the example 1-1.

Example 1-4

A sheet glass flattening process is performed similar to the example 1-1, except that an ammonium sulfate is used instead of caustic soda as a water soluble inorganic material. The result is almost similar to that in the example 1-1. The surface of the glass sheet after the annealing is covered with a dense film of sodium sulfate. The film can be easily removed by water cleaning.

Example 1-5

In order to finish the surface roughness Rmax to about 20 angstroms, a 66 mm⌀ magnetic recording disk glass substrate with a flatness of 5 μm or less (2 μm or less in average) manufactured in the example 1-1 is beveled, then sand-blasted with #400 and #1000 abrasive grains, polished with a cerium oxide ($CeO_2$), and finally cleaned.

Next, a chemical reinforcement is made by subjecting the above-mentioned disk glass substrate to a low-temperature ion exchanging treatment. In the conventional sheet glass flattening process, flaws and fused foreign matters which cannot be removed in the pre-polishing step are left at this ion exchange, whereby an uniform chemical reinforcement cannot be performed sometimes. However, the flattening process according to the present invention allows an uniform chemical reinforcement and the prevention of damages due to uneven stress.

Next, an underlayer consisting of Al (of a thickness of 50 angstroms)/Cr (1000 angstroms)/CrMo (100 angstroms), a magnetic layer consisting of CoPtCr (120 angstroms)/CrMo (50 angstroms)/CoPtCr (120 angstroms), and a protection layer of Cr (50 angstroms) are formed on both sides of a substrate by the in-line sputtering apparatus.

The substrate is immersed into an organic silicon compound solution in which silica fine particles (of a particle diameter of 100 angstroms) are dispersed, and then sintered to form a $SiO_2$ protection layer. Furthermore, the protection layer is dipped with a lubricant consisting of a perfluoro polyether to form a lubricant layer 7. Thus a magnetic recording disk used for a MR (Magnetic Resist Type) head can be obtained.

In the magnetic head flying test to the above-mentioned magnetic recording disk, it was confirmed that a head crush does not occur. Moreover, it was confirmed that no defects in the substrate surface does not cause any defects in a film such as a magnetic layer.

The magnetic recording disk described above is more inexpensive than the conventional one and has no defects on the substrate surface. Hence it was ascertained that the magnetic recording disk has no error causing defects which harms to the magnetic film formation and has excellent magnetic characteristics.

Example 1-6

In a similar manner to the example 1-5, a thin-film head magnetic recording disk is obtained. However, the underlayer is formed of Al/Cr/Cr and the magnetic layer is formed of CoNiCrTa. As to this magnetic recording disk, an advantage similar to that in the example 1-5 were confirmed.

The first embodiment has been explained according to the preferable examples. However, this invention should not be limited only to the above-described examples.

As described above, according to the sheet glass flattening method of the present invention, the thermal bonding between laminated thin sheet glass substrates are prevented while plural thin sheet glass substrates laminated can be treated effectively and thermally without producing flaw and bonding foreign matters, thus being formed with a flatness of higher accuracy. The thin glass substrate according to the present embodiment has an excellent flatness and is not expensive.

Moreover, in the magnetic recording medium according to the first example, a glass substrate has an excellent flatness and foreign matters are not bonded on the substrate surface. Hence the head crush can be prevented. No flaws occurring on the substrate surface results in no defects in a film such as a magnetic layer.

Next, glass substrate for an information recording disk manufacturing method and a magnetic recording disk manufacturing method according to the second embodiment will be explained below in detail.

In the glass substrate for an information recording disk manufacturing method according to the second embodiment, at least the end surface (including a beveling portion and a side wall portion) of a disklike glass substrate flattened according to the first embodiment is treated with a treating solution including a hydrofluosilicic acid (hereinafter, referred to as hydrofluosilicic acid treating solution).

Treating with a hydrofluosilicic acid solution (hereinafter, referred to as a hydrofluosilicic acid treatment) is carried out after any one of steps of cutting and polishing a disklike glass substrate, or each step. Usually, it is desirable to do the hydrofluosilicic acid treatment after an accurate cutting step.

The cutting and polishing step is roughly divided into (1) roughing cut (coarse cutting), (2) sand blasting (fine polishing), (3) first polishing, and (4) second polishing (final polishing).

The hydrofluosilicic acid treatment may be carried out by contacting only the end surface of a glass substrate to a hydrofluosilicic acid solution, or by contacting the whole glass substrate to the same.

In order to contact only the end surface of a glass substrate to a hydrofluosilicic acid solution, glass substrates laminated, for example, are immersed into a hydrofluosilicic acid solution.

Contacting the whole glass substrate to a hydrofluosilicic acid solution can be performed with cleaning the surface of the glass substrate. Hence the glass substrate washing step and the glass substrate end surface treating step can be performed as a single step at a time by cleaning with a hydrofluosilicic acid solution, instead of the conventional cleaning with pure water.

It is preferable to subject the outer end surface and inner end surface of a glass substrate to the hydrofluosilicic acid treatment, but it is possible to apply the same acid treatment only to either end surface.

A fluosilicic acid ($H_2SiF_6$) is typically used as the hydrofluoric acid. In order to improve the cleaning effect or the like, fluoric acid (such as hydrofluoric acid) and cleaning agents (neutral detergent, surface-active agent, alkali detergent, or the like) available commercially can be added in trace amounts as the hydrofluosilicic acid treating solution.

It is desirable that the concentration of the hydrofluosilicic acid is 0.01 to 10 per cent by weight. In the hydrofluosilicic acid, a concentration of less than 0.01 wt % shows a poor etching effect and cleaning effect, but a concentration of more than 10% causes rough surfaces and dusting.

It is desirable that the treating hour ranges from 1 to 10 minutes. Where the treating hour is less than 30 seconds, the good surface roughness (Rmax 2 µm or less) at which dusting from the glass substrate end surface can be prevented cannot be obtained. In the case of a treating hour of 15 minutes or more, the roundness of a glass substrate is impaired or the surface roughness of the end is deteriorated.

Where the hydrofluosilicic acid treatment is performed after each of steps of cutting and polishing, the total treating hour is selected to cover the whole treatment range. It is desirable that the treating temperature is 10° to 50° C.

The kind, size, thickness, etc. of the glass substrate are not particularly restricted. As the material of the glass substrate are listed, for example, aluminosilicate glass, soda-lime glass, soda-aluminosilicate glass, aluminoborosilicate glass, borosilicate glass, quartz glass, chain silicate glass, or the like. The hydrofluosilicic acid shows specially a good chemical etching controllability to aluminosilicate glass. Hence a good surface roughness which can very easily prevent dusting from the end surface of a glass surface can be obtained without impairing the roundness of the glass substrate.

It is desirable that the aluminosilicate glass includes as main components $SiO_2$ of 62 to 75 wt %, $Al_2O_3$ of 5 to 15 wt %, $Li_2O$ of 4 to 10 wt %, $Na_2O$ of 4 to 12 wt %, and $ZrO_2$ of 5.5 to 15 wt %. It is preferable that the chemical reinforcement glass includes $Na_2O/ZrO_2$ of a weight ratio of 0.5 to 2.0 and $Al_2O_3/ZrO_2$ of a weight ratio of 0.4 to 2.5.

Such an aluminosilicate glass chemically strengthened has the increased bend-brittle strength, deep compressed stress layer, and excellent Knoop hardness.

In the second embodiment, the step of chemically strengthen a glass substrate surface by the ion exchanging method may be added as a post step in the magnetic recording disk glass substrate manufacturing method.

The chemical strengthening method is not specially limited if a conventional well-known chemical strengthening method is selected. However, it is preferable to select the low temperature reinforcement where the ion exchange is performed in the regions not exceeding the transition point, in the view of the glass transition point. Potassium nitrate, sodium nitrate, and nitrate in combination of them are listed as the alkali molten salt used for the chemical reinforcement.

The above-described hydrofluosilicic acid treatment can be applied to the glass substrate for an information recording disk after the chemical reinforcement.

The glass substrate for an information recording disk manufacturing method according to the second embodiment can be utilized as a method of processing the end surface of an electronic optical disk substrate such as a magnetic recording disk glass substrate, an optical magnetic recording disk glass substrate, an optical disk kept away from dusts, an optical memory, or the like.

By using the chemically strengthen method according to the present invention described above, a compressive strain layer is formed 50 μm depth from the surface of the glass substrate. The tensile stress value of a tensile stress layer inside the compressive strain layer is 4 kg/mm$^2$ or less.

The sheet glass used in the second embodiment may be shaped using the pressing method.

Next, the magnetic recording disk manufacturing method according to the second embodiment will be explained below.

In the magnetic recording disk manufacturing method according to the second embodiment, a magnetic layer is formed at least on a magnetic recording disk glass substrate as a post step of the above-mentioned magnetic recording disk glass substrate manufacturing method.

According to the second embodiment, since a dust- and defect-free glass substrate is used, a high-quality magnetic recording disk can be obtained. Namely, the frequency of the head crush of the magnetic recording disk is very small by using a glass substrate with good surface condition and of less dusting, compared with the conventional one. Moreover, there is no problem in that a defect occurs in a film such as a magnetic layer, thus resulting in an error.

The magnetic recording medium is usually manufactured by sequentially laminating an underlayer, a magnetic layer, a protection layer, and a lubricant layer, on a magnetic recording disk glass substrate.

The magnetic recording medium is usually manufactured by sequentially laminating an underlayer, a magnetic layer, a protection layer, and a lubricant layer, on a magnetic recording disk glass substrate with its predetermined flatness and surface roughness of which the surface is chemically reinforced.

In the magnetic recording medium, nonmagnetic thin films such as Cr, Mo, Ta, Ti, W, Al, and the like are listed as the underlayer. The magnetic recording medium may be formed of a mullet-underlayer of Al/Cr/CrMo or Al/Cr/Cr.

A magnetic thin film of CoPtCr or CoNiCrTa including Co as a major component, for example, is listed as the magnetic layer. The magnetic layer may have nonmagnetic films divided and may be formed of a multilayer structure of CoPtCr/CrMo/CoPtCr, or the like to reduce noises. The magnetic layer may be a magnetic layer for horizontal magnetic recording or vertical magnetic recording.

For example, a Cr film, a Cr alloy film, a carbon film, a zirconia film, a silica film, and the like are listed as the protection layer. These protection films can be sequentially formed together with the underlayer and the magnetic layer, and the like, using an in-line sputtering apparatus. These protection films may be formed as a single layer or a multilayer structure formed of the same or different kinds of films.

Other protection layer may be further formed on the above-mentioned protection layer. For example, a tetra-alkoxysilane diluted with an alcohol series solvent is coated on the protection layer. Then a sintered silicon dioxide (SiO2) may be formed.

The lubricant layer, for example, is formed by diluting a perfluoro polyether (PFPE) acting as a liquid lubricant agent with a Freon series solvent, coating the diluted agent on the medium surface according to the dipping method, spin-coating method, or spraying method, and then, if necessary, heating the resultant.

[Examples of the Second Embodiment]

The second embodiment will be explained below in more detail according to examples.

Example 2-1

(1) Coarse Polishing Step

First, a glass substrate formed of a 96 mmø, 3 mm thick disklike aluminosilicate glass is prepared by cutting a sheet glass formed by the down-drawing method and the flattening method according to the first embodiment, with a cutting whetstone. Thus a 96 mmø diameter, 1.5 mm thick substrate is formed by cutting the glass substrate with a relatively coarse diamond whetstone.

A chemical reinforcement glass including SiO2 of 63 wt %, Al2O3 of 14 wt %, Li2O of 6 wt %, Na2O of 10 wt %, and ZrO2 of 7 wt % as major components is as an aluminosilicate glass.

Next, both the surfaces of the glass substrate are polished alternately using a diamond whetstone with finer grain than that of the above-mentioned whetstone. In this case, the load is about 100 kg. Thus, the surface roughness RMax (measured in JISB0601) of either surface of the glass substrate is finished to about 10 μm.

First Cleaning Step

The surface of the glass substrate after the shaping process is rinsed.

(2) Sand-blasting (Lapping) Step

Next, the glass substrate is subjected to a sandblasting process. This sand-blasting process is carried out to improve the size accuracy and shape accuracy. The sand-blasting process is carried out using a lapping apparatus. The sand-blasting was performed twice by changing the abrasive grain from the grain size #400 to the grain size #10000.

In detail, first, both the surfaces of a glass substrate housed in a carrier are lapped so as to have a surface accuracy of 0 to 1 μm and a surface roughness of (Rmax) of about 6 μm by using alumina grains of grain size #400, setting a load L of about 100 kg, and by rotating the inner gear and the outer gear.

Next, the grain size #1000 of alumina abrasive grain is selected to lap the surface roughness (Rmax) to about 2 μm.

Second Cleaning Step

The glass substrate to which the sand-blasting has finished is cleaned by immersing sequentially it into a hydrofluosilicic acid (of 2% concentration) bath, a neutral cleaning agent bath, a neutral cleaning bath, and a water bath.

The immersing hour to the hydrofluosilicic acid is 1 to 3 minutes. Ultrasonic waves are applied to each cleaning bath.

Cleaning with the hydrofluosilicic acid sets the surface roughness of each of the outer end surface and the inner end surface to 3 μm, without impairing the roundness.

(3) First Polishing Step

Next, the first polishing step is carried out. This polishing step is implemented using a polishing apparatus to remove flaws and distortions left in the sand-blasting step.

In detail, a hard polisher (cerium pad MHC15 manufactured by SPEEDFAM CO.) is used as a polisher (polishing powder). The first polishing step is made under the following polishing requirements:

Polishing solution: Cerium oxide+water

Load: 300 g/cm$^2$ (L=238 kg)

Polishing hour: 15 minutes

Removed amount: 30 μm

Lower sheetn rotation number: 40 rpm

Upper sheetn rotation number: 35 rpm

Inner gear rotation number: 14 rpm
Outer gear rotation number; 29 rpm
Third cleaning step The glass substrate to which the sand-blasting has finished is cleaned by immersing sequentially it into a hydrofluosilicic acid (of 2% concentration) bath, a neutral cleaning agent bath, a pure water bath, a pure water bath, an IPA (isopropyl alcohol), and an IPA (steam drying) bath.

The immersing hour to the hydrofluosilicic acid is 1 to 3 minutes. Ultrasonic waves are applied to each cleaning bath.

Cleaning with the hydrofluosilcic acid sets the surface roughness of each of the outer end surface and the inner end surface to 2 μm, without impairing the roundness.

(4) Second Polishing Step

Next, the polishing apparatus used in the first polishing step is used. Then the second polishing step is performed by changing a hard polisher to a soft polisher (Polirax manufactured by SPEEDFAM CO.). The polishing requirement is same as that in the first polishing step, except that the load is 100 g/cm2, the polishing hour is 5 minutes, and the removed amount is 5 μm.

Fourth Cleaning Step

The glass substrate to which the sand-blasting has finished is cleaned by immersing sequentially it into a neutral cleaning agent bath, a neutral cleaning agent, a pure water bath, a pure water bath, an IPA (isopropyl alcohol), and an IPA (steam drying) bath.

Ultrasonic waves are applied to each cleaning bath.

(5) Chemical Strengthening Step

Next, the glass substrate to which the cutting and polishing steps have been finished is chemically reinforced. The chemical reinforcement is made by preparing a chemical reinforcement solution obtained by mixing potassium nitride (60%) and sodium nitride (40%), heating the chemical reinforcement solution at 400° C., preheating the glass substrate at 300° C., and then immersing the cleaned glass substrate into the solution for 3 hours. In order to chemically reinforce the whole surface of the glass substrate, the immersing operation is performed by containing the plural glass substrates in a holder, with the end surfaces held.

As described above, lithium ions and sodium ions in the surface layer of the glass substrate are respectively replaced by sodium ions and potassium ions in the chemical reinforcement solution by immersing into a chemical reinforcement solution. Thus the glass substrate is reinforced.

The compressed stress layer formed on the surface layer of the glass substrate has a thickness of about 100 to 200 μm.

The glass substrate chemically reinforced is immersed into a water bath of 20° C. to cool rapidly, and then maintained for about 10 minutes.

Fifth Cleaning Step

The glass substrate rapidly cooled is heated at about 40° C., immersed into a sulfuric acid, and then cleaned under ultrasonic waves. Any foreign matter is not recognized in an inspection of the surface of the glass substrate thus obtained. Cleaning with the sulfuric acid does not cause any change in the surface roughness of each of the outer peripheral end surface and the inner peripheral end surface, and the roundness.

(6) Magnetic Recording Disk Manufacturing Step

Using an in-line sputtering apparatus, a magnetic recording disk is obtained by sequentially forming a Cr underlayer, a CrMo underlayer, a CoPtCr magnetic layer, and a C protection layer on both the surfaces of the magnetic recording disk glass substrate obtained in the above-described step.

Where the magnetic recording disk thus formed was subjected to a gliding test, hit (where a head grazes protrusions formed on the surface of a magnetic recording disk) and crush (where a head collides with a protrusion formed on the surface of a magnetic recording disk) were not recognized. Moreover, it was confirmed that no occurrence of foreign matters and defects due to dusting results in no defects in a film such as a magnetic layer.

Example 2-2

This process is similar to the example 2-1, except that the hydrofluosilicic acid cleaning process is performed only in the second cleaning step and hydrofluosilicic acid is not used in other cleaning steps. A magnetic recording disk glass substrate as well as a magnetic recording disk are obtained through this process. The result was similar to that in the example 2-1.

Example 2-3

This process is similar to the example 2-1, except that the hydrofluosilicic acid cleaning process is performed in the second to fourth cleaning steps. A magnetic glass substrate as well as a magnetic recording disk are obtained through such a process. The result was similar to that in the example 2-1.

Examples 2-4 and 2-5

This process is similar to the example 2-1, except that soda-lime glass (example 2-3) and soda-aluminosilicate glass are used instead of the aluminosilicate glass. Thus a magnetic glass substrate as well as a magnetic recording disk are obtained.

As a result, in the case of soda-lime glass, the surface of each of the outer peripheral end surface and inner peripheral end surface of a glass substrate is 3 μm. The surface is rough, compared with the use of aluminosilicate glass, However, there is not any problem in dust prevention in practice use.

Example 2-6

An underlayer of Al (50 angstroms thick)/Cr (1000 angstroms)/CrMo (100 angstroms), a magnetic layer of CoPtCr (120 angstroms)/CrMo (50 angstroms)/CoPtCr (120 angstroms), and a Cr (50 angstroms) protection layer are formed on both surfaces of a magnetic recording disk glass substrate obtained in the example 1 by an in-line sputtering apparatus.

The above-described substrate is immersed into an organic silicon compound solution (being a mixed solution of water, IPA, and tetraethoxysilane) dispersed with silica fine particles (of a particle size of 100 angstroms), and then sintered so that a SiO2 protection layer is formed. Moreover, the protection layer is dipped into a solvent of perfluoropolyether to form a lubricant layer. Thus a magnetic head is obtained.

The magnetic recording disk obtained is subjected to a gliding test. However, any hit or clash was not observed. It was confirmed that there is no defect in a film such as a magnetic layer.

Example 2-7

This process is similar to the example 5, except that the underlayer is formed of Al/Cr/Cr and the magnetic layer is formed of CoNiCrTa. Thus a magnetic recording disk for a thin-film head was obtained. As to the magnetic recording disk, the result similar to that in the example 2-5 was confirmed.

Reference 1

This process is similar to the example 1, except that a fluoric acid is used instead of a hydrofluosilicic acid, without performing hydrofluosilicic acid cleaning treatment. Thus a magnetic recording disk glass substrate and a magnetic recording disk were obtained.

As a result, the surface roughness of each of the outer peripheral surface and inner peripheral surface of the glass substrate is 4 to 5 μm and the roundness is deviated from a allowable value. It is understood that the center deviation results in a defect product. As described here, the fluoric acid treatment damages largely glass and has a poor etching controllability.

After the magnetic recording disk obtained was subjected to a gliding test, a hit or crush was observed.

The second embodiment has been described with the above-mentioned examples. However, it should not be noted that the embodiment is limited only to the examples.

For example, a commercially available surface-active agent and a cleaning agent (including alkali cleaning agents) may be used in the cleaning step, instead of a neutral cleaning agent.

Moreover, as a polishing agent can be used cerium oxide ($CeO_2$), alumina ($\gamma$-$Al_2O_3$), iron oxide red ($Fe_2O_3$), chromium oxide ($Cr_2O_3$), zirconium oxide ($ZrO_2$), titanium oxide ($TiO_2$), and the like. An element material of suede velour may be used as a soft polisher, and hard velour, urethane foam, pitch-sintered suede, and the like may be used as a hard polisher.

As described above, according to the glass substrate for an information recording disk manufacturing method of the second embodiment, since the end surface of a glass substrate is treated with hydrofluosilicic acid, the surface roughness of the end surface of the glass substrate is improved, whereby dusting from the glass end surface can be prevented.

The hydrofluosilicic acid having a weak etching effect can improve the surface roundness of the end surface of a glass substrate, thus preventing dusting from glass end surface.

Moreover, according to the magnetic recording disk manufacturing method of the second embodiment, adhesion of foreign matters as well as marks due to polishing and cutting a glass substrate surface can be reduced. As a result, a high-quality magnetic recording disk with no flaws can be manufactured at high yield.

A magnetic recording medium such as a magnetic recording disk has been described as the application field of the second embodiment. However, it should be noted that the second embodiment is not limited only to the examples. The second embodiment is advantageously applicable to glass substrates for an information recording disk such as optical memories.

Next detail explanation will be made below as to the information recording glass manufacturing method and magnetic recording disk manufacturing method according to the third embodiment.

As to the third embodiment, the present inventor has studied the reason why abnormal protrusions occur on the surface of a magnetic recording disk. The inventor found that deposit molten salt (e.g. KCl) adhered stubbornly on a glass substrate pulled up from a chemical reinforcement solution cannot be removed by a cleaning treatment, and that the deposit molten salt being a foreign matter causes abnormal protrusions formed on the surface of a magnetic recording disk.

We have further proceeded to continue this study in consideration of the knowledge. As a result, the adhesion conditions of the deposit molten salt to a substrate are different in the cooling step after the chemical reinforcement. In detail, the deposited molten salt adheres strongly to a substrate in a slow cooling step like natural heat-dissipation, but the deposited molten salt obtained through the rapid cooling step is very brittle and is easily washed away. Thus we have come to completion of the third embodiment.

According to the magnetic recording disk glass substrate manufacturing method of the third embodiment, first a glass substrate formed according to the first embodiment is immersed into a chemical reinforcement solution heated and then chemically reinforced by exchanging ions in the glass substrate surface layer for ions in the chemical reinforcement solution.

A low-temperature ion exchanging method, a high-temperature ion exchanging method, a surface crystallizing method, a glass surface dealkali method, etc. are well-known as an ion exchanging method.

The low-temperature ion exchanging method is a method of strengthening the glass surface by replacing alkali ions in a glass by alkali ions with an ion radius larger than that thereof over a temperature range less than the glass transition point Tg and then producing a strong compressed stress to the glass surface layer because of an increased capacity of the ion exchanged portion.

As the chemical reinforcement solution are listed a molten salt such as potassium nitride ($KNO_3$), sodium nitride ($NaNO_3$), and potassium carbonate ($K_2CO_3$), a molten salt of in combination of the above-listed salts ($KN_3$+$NANO_3$, $KNO_3$+$K_2CO_3$, or the like), a molten salt made by mixing the above-listed salts with a salt of $Cu^+$, $Ag^+$, $Rb^+$, $Cs^+$, or the like, and the like. The chemical reinforcement solution may be a solution of one of the above-listed salts, instead of the molten salt.

It is preferable that the heating temperature is 350° C. to 650° C., and particularly to 350° C. to 480° C., and more particularly 350° C. to 450° C., in the view of glass transition point.

It is preferable that the immersion hour is 1 to 20 hours, in the view of the bend-brittle strength and stress distortion layer.

It is preferable that the compressed stress layer formed in the glass substrate surface layer has a thickness of 60 to 300 μm, in the view of increasing the shock resistance and vibration resistance.

In order to prevent a glass substrate's breakage or crack, it is preferable that a glass substrate is preheated at 200° to 350° C., prior to immersing the glass substrate into a molten salt. In the chemical strengthening step, it is preferable to hold the end surface of a glass substrate for chemical reinforcement to chemically strengthen the whole surface of the glass substrate.

In the third embodiment, after the chemical reinforcement, the glass substrate is pulled up from the chemical reinforcement solution to anneal to a predetermined temperature (a temperature higher than the temperature at which crystallization of a molten salt begins).

The lower temperature in the annealing is not unconditionally determined because it depends on the kind of chemical reinforcement solution used (the kind of deposit molten salt). However, it is preferable to anneal to a higher temperature than the temperature at which the crystallization of molten salt begins.

It is preferable that the annealing rate of the glass substrate is 2° C./min. to 100° C./min., and particularly 5° C./min. to 60° C./min., and further particularly 10° C./min. to 50° C./min.

In the third embodiment, the glass substrate is rapidly cooled at the rate at which crystallization of the molten salt deposited on the glass substrate surface after the annealing is prevented.

It is preferable that the rate of rapidly cooling the glass substrate is 1600° C./min. to 200° C./min., particularly 1200° C./min. to 300° C./min., and further particularly 800° C./min. to 400° C./min.

It is preferable to rapidly cool the glass substrate by contacting it with a refrigerant carrier of, preferably, 100° C. to 0° C., and more preferably with 40° C. to 10° C., in the view of discriminating a failure product due to heat shock.

It is preferably that the contact time of the glass substrate to a refrigerant carrier is about 10 to 60 min., in the view of the cleaning effect.

As the refrigerant carrier are listed liquid refrigerant carrier such as water, warm water, solution, liquid nitrogen, or the like; gas refrigerant carrier such as nitrogen, moisture vapor, cooled air; air blasting; and the like.

In the third embodiment, the glass substrate is cleaned after the rapid annealing and then the deposit molten salt adhered to the glass substrate is removed.

If there is a suitable deposit molten salt removing method, the cleaning method is not specially limited. For example, as the cleaning method is listed the method of immersing and cleaning a glass substrate into an acid such as heated sulfuric acid, phosphoric acid, nitric acid, fluoric acid, hydrochloric acid, or the like, a mixed acid in combination of them, or one of these acids plus a salt thereof, or the like. In this case, the glass substrate may be cleaned with ultrasonic waves. After the acid cleaning, a well-known cleaning such as a cleaning with a commercially available cleaning agent (neutral cleaning agent, surface-active agent, alkaline cleaning agent, or the like), a scrubbing cleaning, pure water cleaning, a solvent cleaning, or solvent drying, or the like may be treated. Each cleaning may be carried out under heating or applying ultrasonic waves.

An ion exchangeable glass substrate may be selected as a glass substrate, without any limitation. This is applicable to the size and thickness of a glass substrate.

As the glass substrate material are listed, for example, a multi-component series glass containing ion changeable ions such as lithium ions ($Li^+$) or sodium ion ($Na^+$) of aluminosilicate glass, soda-lime glass, soda-aluminosilicate glass, or the like.

Aluminosilicate glass which exhibits its high strength, deep compressed stress layer, excellent shock resistance, and excellent vibration resistance after a chemical reinforcement is specially preferable.

Such aluminosilicate glass being an aluminosilicate glass containing the component according to the second embodiment which is chemically reinforced exhibits its excellent heat resistance, good flatness due to no Na deposit under high-temperature circumstances, and excellent Knoop hardness.

The magnetic recording disk glass substrate manufacturing method according to the third embodiment can be used as an end surface processing method suitable for a glass substrate for a magnetic recording disk and an optical magnetic recording disk as well as an electronic optical disk substrate such as an optical disk which dislikes abnormal protrusions and fine flaws, in addition to a magnetic recording disk.

The sheet glass used in the third embodiment may be shaped using the pressing method.

Next, the magnetic recording disk manufacturing method according to the third embodiment will be explained below.

In the magnetic recording disk manufacturing method according to the third embodiment, a magnetic layer is formed at least on a magnetic recording disk glass substrate obtained using the magnetic recording disk glass substrate manufacturing method.

According to the third embodiment, using a glass substrate of which its surface has no abnormal protrusions and no minute flaws leads to a high-quality magnetic recording disk. That is, where a magnetic recording disk is formed from the glass substrate, the head crush due to abnormal protrusions does not occur because a glass substrate with its surface much better than that of the conventional one is used. Moreover, the defect due to a flaw formed in a film such as a magnetic layer does not cause an error.

The magnetic recording medium is usually manufactured by sequentially laminating an underlayer, a magnetic layer, a protection layer, and a lubricant on the magnetic recording disk glass substrate. The underlayer, the magnetic layer, the protection layer, and the lubricant layer are similar to those in the second embodiment, respectively.

[Third embodiment]

The third embodiment will be explained below in more detail by referring to examples.

Example 3-1

The magnetic recording disk glass substrate manufacturing method is roughly divided into (1) cutting and polishing step, (2) chemically strengthen step, (3) cooling step, and (4) cleaning step.

(1) Cutting and Polishing Steps

First, a sheet glass of aluminosilicate glass is prepared by the down drawing method. As the aluminosilicate glass are used a chemical reinforcement glass containing $SiO_2$ of 63 wt %, $Al_2O_3$ of 14 wt %, $Li_2O$ of 6 wt %, $Na_2O$ of 10 wt %, and $ZrO_2$ of 7 wt % as major components.

Successively, a disklike glass is cut from the sheet glass using a cutting whetstone. Next, the front surface and back surface are cut by a sand blasting operation. The center portion of the glass substrate is perforated in a disk form. The inner peripheral surface and outer peripheral surface perforated are polished with a whetstone to determine the outer diameter and the inner diameter while they are bevelled. The front surface and back surface are subjected to an accurate polishing step as a final polishing step. Thus a disklike glass substrate is obtained.

(2) Chemically Strengthen Step

Next, the glass substrate cut and polished is cleaned and then chemically reinforced. The chemical reinforcement is performed by preparing a chemical reinforcement solution of a mixture of potassium nitride (60%) and sodium nitride (40%), heating the chemical reinforcement solution at 400° C., and immersing the glass substrate preheated at 300° C. for 3 hours. In order to chemically reinforce the whole surface of the glass substrate, the immersion is made with the ends of plural glass substrates contained and held in a holder.

Thus, the glass substrate is reinforced by immersing the glass substrate into a chemical reinforcement solution and then by replacing the lithium ions and sodium ions by sodium ions and potassium ions in a chemical reinforcement potassium.

The thickness of a compressed stress layer formed on the surface layer of a glass substrate is about 100 to 200 μm.

(3) Cooling Step

The glass substrate chemically reinforced is gradually cooled in the first and second annealing chambers. First, the glass substrate is pulled up from the chemical reinforcement solution, transferred it into the first annealing chamber at 300° C., and kept it for 10 minutes in the first annealing chamber to anneal to 300° C. Next, the glass substrate is transferred from the first annealing chamber to the second annealing chamber heated at 200° C. to anneal it from 300° C. to 200° C.

This two-step annealing treatment can liberate the glass substrate from damage due to thermal distortion. Next, the glass substrate rapidly cooled is immersed into a water bath of 20° C. and then maintained for 20 minutes.

(4) Cleaning Step

The glass substrate subjected to the cooling step is immersed into a sulfuric acid heated at about 40° C. and then cleaned under ultrasonic waves.

The magnetic recording disk glass substrate fabricated through the above-described step is subjected to a visual inspection, with the surface irradiated at 150,000 lux with a halogen lamp. As a result any foreign matter causing possible problems did not found.

(5) Magnetic Recording Disk Manufacturing Step

A magnetic recording disk is obtained by sequentially forming a Cr underlayer, a CrMo underground layer, a CoPtCr magnetic layer, and a C protection layer on both the surfaces of the magnetic recording disk glass obtained in the above-described step, using an in-line sputtering apparatus.

The magnetic recording disk obtained is subjected to a gliding test. As a result, a hit (meaning that a head grazes protrusions on the surface of a magnetic recording disk) and a crush (meaning that a head collides protrusions on the surface of a magnetic recording disk) were not observed. It was confirmed that no defects in a film such as a magnetic layer were observed.

Examples 3-2 and 3-3

This is similar to the example 3-1, except that a soda-lime glass (example 3-2) and a soda-aluminosilicate glass (example 3-3) are used instead of an aluminosilicate glass. Thus a magnetic recording disk glass and a magnetic recording disk can be obtained.

As a result, the depth of the compressed stress layer is shallow. However, there is no problem in practical use.

Example 3-4

An underlayer of Al (50 angstroms thick)/Cr (1000 angstroms)/CrMo (100 angstroms), a magnetic layer of CoPtCr (120 angstroms)/CrMo (50 angstroms)/CoPtCr (120 angstroms), and a Cr (50 angstroms) protection layer are formed on both surfaces of a magnetic recording disk glass substrate obtained in the example 3-1, using an in-line sputtering apparatus.

The above-described substrate is immersed into an organic silicon compound solution (being a mixed solution of water, IPA, and tetraethoxysilane) dispersed with silica fine particles (of a particle size of 100 angstroms), and then sintered so that a SiO2 protection layer is formed. Moreover, the protection layer is dipped into a lubricant of perfluoro polyether to form a lubricant layer. Thus a MR magnetic head is obtained.

The magnetic recording disk obtained was subjected to a gliding test. However, any hit or clash was not observed. It was confirmed that there is no defect in a film such as a magnetic layer.

Example 3-5

This process is similar to the example 5, except that the underlayer is formed of Al/Cr/Cr and the magnetic layer is formed of CoNiCrTa. Thus a magnetic recording disk for a thin-film head was obtained. As to the magnetic recording disk, the result similar to that in the example 2-5 were confirmed.

Example 3-6

This is similar to the example 3-1, except that the chemical reinforcement solution is heated to 500° C. and the glass substrate preheated at 350° C. is chemically reinforced.

As to the magnetic recording disk, the result similar to that in the example 3-1 were confirmed.

Comparison Example in the Third Embodiment

This is similar to the example 3-1, except that the glass substrate completely annealed is naturally cooled without rapidly cooling. Thus a magnetic recording disk glass substrate and a magnetic recording disk were obtained.

Like the example 3-1, the visual inspection is made to the magnetic recording disk glass substrate. As a result, it was observed that the surface has about 10 to 100 foreign matters.

The magnetic recording disks thus obtained was subjected to a gliding test. Hits and crushes were observed to about 20% of the magnetic recording disks tested.

The present embodiment has been described with reference to preferable examples. The third embodiment should not be limited only to the above-described examples.

For example, a commercially available surface-active agent and a cleaning agent (including alkali cleaning agents) may be used in the cleaning step, instead of a neutral cleaning agent. Moreover, as an abrasive agent can be used cerium oxide (CeO2), colloidal silica (SiO2), alumina (γ-Al2O3), iron oxide red (Fe2O3), chromium oxide (Cr2O3), zirconium oxide (ZrO2), titanium oxide (TiO2), and the like. A material of suede velour may be used as a soft polisher, and hard velour, urethane foam, pitch-sintered suede, and the like may be used as a hard polisher.

As described above, according to the glass substrate for an information recording disk manufacturing method of the second embodiment, since the deposit molten salt adhered on a glass substrate can be easily removed by cleaning, a magnetic recording disk glass substrate with high flatness and no abnormal protrusions can be manufactured.

Since the molten salt deposited between the glass substrate end surface and the holding member is brittle, the glass substrate can be taken out of the holding member without any breakage of the end surface thereof, Moreover, since a minute surface flaw or mark causes breakage in the rapid cooling process, a defect product can be easily discriminated.

Furthermore, according to the present invention of the third embodiment, a magnetic recording disk glass substrate with no abnormal protrusions and no minute flaws on the surface thereof is used, a high-quality magnetic recording disk with fewer defect due to abnormal protrusions and minute flaws can be manufactured at high yield.

Next, the information recording glass manufacturing method and magnetic recording disk manufacturing method according to the four embodiment will be explained below in detail.

In the magnetic recording disk glass substrate manufacturing method according to the fourth embodiment, the glass substrate prepared according to the first embodiment is reinforced by first immersing it into a chemical reinforcement solution heated and then exchanging ions formed on the glass substrate surface with ions in the chemical reinforcement solution.

As the ion exchanging method, it is preferable to use a low-temperature ion exchanging method because of the same reason as that in the third example.

The four embodiment is equivalent to the third embodiment in the contents and conditions of the chemical reinforcement solution, heating temperature, immersing hour, the thickness of the compressed stress layer formed on a glass substrate layer, and the pre-treatment of immersing a glass substrate into a molten salt.

In the chemical reinforcement step according to the fourth embodiment, it is preferable that the glass substrate of which the end surface is held is chemically reinforced to chemically reinforce the whole glass substrate.

Like the third embodiment, after the chemical reinforcement operation in the fourth embodiment, it is preferable that the glass substrate is pulled up from the chemical reinforcement solution and then annealed to a predetermined temperature to suppress the thermal distortion occurrence. This annealing treatment allows the glass substrate from being released from the damage from thermal distortion.

In the fourth embodiment, the glass substrate is annealed at the same rate as that in the third embodiment. After the annealing step, it is preferable to quickly cool the glass substrate at the rate shown in the third embodiment to prevent the molten salt deposited on the glass substrate surface from being recrystallized. Thus when the glass substrate is quickly cooled, the deposit molten salt becomes brittle so that the cleaning effect of an acid cleaning (to be described later) can be improved.

The glass substrate rapid cooling is treated under the same condition (on temperature and hour) using the refrigerant carrier.

In the fourth embodiment, the deposit molten salt adhered to the glass substrate is removed by cleaning the surface thereof after the cooling step.

The cleaning is made by immersing the glass substrate into a cleaning agent containing a heated acid such as sulfuric acid, phosphoric acid; nitric acid, fluoric acid, or hydrochloric acid, a mixed acid of the above-listed acids, or one of the above-listed acids plus a salt thereof (such as ammmonium fluoride or potassium nitride) thereof. In this case, the glass substrate may be cleaned under ultrasonic waves.

Of these cleaning agents, it is preferable to select a cleaning agent containing sulfuric acid and/or phosphoric acid, in the view of the cleaning effect to the deposit molten salt. In this case, the cleaning effect is further improved by cleaning with the reaction heat of the cleaning agent containing sulfuric acid and/or phosphoric acid plus hydrogen peroxide.

The acid cleaning may be carried out by sequentially immersing the glass substrate into plural same or different acid cleaning baths.

The concentration of acid is determined in consideration of the cleaning effect. The optimum concentration depends on an acid used. For example, the concentration of a sulfuric acid is preferably 1 to 20 wt % or more preferably 2 to 10 wt %.

The heating temperature of acid is preferably 40° to 100° C., or more preferably 40° to 70° C. The acid cleaning hour is preferably 0.5 to 5 minutes, or more prefrably 1 to 3 minutes.

After the acid cleaning, a well-known cleaning treatment including a commercially-available cleaning agent (such as neutral cleaning agent, surface-active agent, or alkaline cleaning agent), scrubbing cleaning, pure-water cleaning, solvent cleaning, solvent steam drying, centrifugal drying or the like may be carried out. Heating and ultrasonic wave application may be performed in each cleaning step.

The ultrasonic wave may be generated by a multi-frequency type generator which oscillates over a frequency range, or a fixed-frequency type generator which oscillates at a fixed frequency. Since the lower frequency leads to higher cleaning effect but may damage largely a glass substrate, the frequency must be determined in consideration of the effect.

The steam drying does not produce a stain due to drying, thanks of its quick drying rate. As the solvent used in the steam drying process are listed iso-propyl alcohol, Freon (trademark), acetone, methanol, ethanol, and the like.

The glass substrate is not limited if it belongs to an ion exchangeable glass substrate. The size, thickness, or the like of the glass substrate is not particularly limited.

As the material of the glass substrate are listed, for example, aluminosilicate glass, soda-lime glass, soda-aluminosilicate glass, aluminoborosilicate glass, borosilicate glass, quartz glass, chain silicate glass, or the like. Particularly, the aluminosilicate glass is preferable because it is relatively immune to the acid cleaning and has its excellent shock resistance and vibration resistance.

The aluminosilicate glass, or an aluminosilicate glass containing the components shown in the second embodiment, chemically strengthened has its excellent heat resistance and does not largely deposit Na under high temperatures, and provides its good flatness and excellent Knoop hardness.

The magnetic recording disk glass substrate manufacturing method according to the fourth embodiment can be applied to the method of cleaning glass substrates used for magnetic recording disks and optical disks as well as electrical optical disk substrates used for optical disks which dislike abnormal protrusions and minute flaws.

The sheet glass used in the fourth embodiment may be shaped using the pressing method.

Next, the magnetic recording disk manufacturing method according to the fourth embodiment will be described below.

In the magnetic recording disk manufacturing method according to the fourth embodiment, a magnetic layer is formed at least on the magnetic recording disk glass substrate obtained the above-mentioned magnetic recording disk glass substrate manufacturing method.

In the fourth embodiment, since a glass substrate with the surface having no molten salt residue and no minute flaws is used, a high-quality magnetic recording disk is obtained. That is, since a glass substrate in the surface condition much better than that of the conventional one is used, a head crush due to molten salt residue does not occur to the magnetic recording disk completed. Hence the case where the flaw in a film such as a magnetic layer causes an error does not occur.

The magnetic recording medium is usually formed by sequentially laminating an underlayer, a magnetic layer, a protection layer, and a lubricant layer on the magnetic recording disk glass substrate. The underlayer, protection layer, and lubricant layer are in content similar to that shown in the second embodiment.

[Fourth embodiment]

The present invention will be further described below according to examples.

Example 1

The magnetic recording disk glass substrate manufacturing method is roughly divided into (1) cutting and polishing step, (2) chemically strengthen step, (3) cooling step, and (4) cleaning step.

(1) Cutting and Lapping steps

First, a sheet glass of aluminosilicate glass is prepared by the down drawing method. As the aluminosilicate glass are used a chemical reinforcement glass containing $SiO_2$ of 62 wt %, $Al_2O_3$ of 15 wt %, $Li_2O$ of 10 wt %, $Na_2O$ of 10 wt %, and $ZrO_2$ of 2 wt % as major components.

Successively, a disklike glass is cut out of a sheet glass using a cutting whetstone. Next, the front surface and back surface are scraped by a sand blasting operation. The center portion of a glass substrate is perforated in a disk form. The inner peripheral surface and outer peripheral surface perforated are polished with a whetstone to determine the outer diameter and the inner diameter while they are bevelled. The front surface and back surface are subjected to an accurate polishing step as a final polishing step. Thus a disklike glass substrate is obtained.

(2) Chemical Strengthening Step

Next, the glass substrate thus cut and polished is cleaned and then chemically reinforced. The chemical reinforcement is performed by preparing a chemical reinforcement solution of a mixture of potassium nitride (60 %) and sodium nitride (40%), heating the chemical reinforcement solution at 400° C., and immersing the glass substrate preheated at 300° C. for 3 hours. In order to chemically reinforce the whole surface of the glass substrate, the immersion is made with the ends of plural glass substrates contained and held in a holder.

Thus, the glass substrate is reinforced by immersing the glass substrate into a chemical reinforcement solution and then by replacing the lithium ions and sodium ions by sodium ions and potassium ions in a chemical reinforcement potassium.

The thickness of a compressed stress layer formed in the surface layer of a glass substrate is about 100 to 200 μm.

(3) Cooling

The glass substrate chemically reinforced is gradually cooled in the first and second annealing chambers. First, the glass substrate is pulled up from the chemical reinforcement solution, transferred it into the first annealing chamber at 300° C., and kept it for 10 minutes in the first annealing chamber to anneal to 300° C. Next, the glass substrate is transferred from the first annealing chamber to the second annealing chamber heated at 200° C. to anneal it from 300° C. to 200° C.

This two-step annealing treatment can liberate the glass substrate from damage due to thermal distortion. Next, the glass substrate rapidly cooled is immersed into a water bath of 20° C. and then maintained for 20 minutes.

(4) Cleaning Step

The glass substrate completely subjected to the cooling step is immersed into a sulfuric acid of a concentration of 8 wt % heated at about 65° C. for 2 minutes and then is subjected to an acid cleaning treatment while ultrasonic waves (of 40 kHz) are applied. Thus a deposit molten salt is removed chiefly.

Next, the glass substrate is cleaned by sequentially immersing it into a neutral cleaning bath, a neutral cleaning bath, a pure water bath, a pure water bath, an IPA (iso-propyl alcohol), and an IPA (steam drying) bath. In this case, ultrasonic waves (of 40 kHz) are applied in each cleaning bath.

The magnetic recording disk glass substrate fabricated through the above-described step was subjected to a visual inspection, with the surface irradiated at 150,000 lux with a halogen lamp. As a result, only 5 foreign matters were found at maximum.

(5) Magnetic Recording Disk Manufacturing Step

A magnetic recording disk is obtained by sequentially forming a Cr underlayer, a CrMo underlayer, a CoPtCr magnetic layer, and a C protection layer on both the surfaces of the magnetic recording disk glass obtained in the above-described step, using an in-line sputtering apparatus.

The magnetic recording disk obtained is subjected to a gliding test. As a result, a hit (meaning that a head grazes protrusions on the surface of a magnetic recording disk) and a crush (meaning that a head collides protrusions on the surface of a magnetic recording disk) were not observed. It was confirmed that no defects in a film such as a magnetic layer were observed.

Example 4-2

This is similar to the example 1, except that an acid cleaning is carried out by immersing a glass substrate into a phosphoric acid of 10 wt % concentration heated to about 40° C. for 2 minutes, instead of the sulfuric acid, under the application of ultrasonic waves (of 32 kHz). Thus a magnetic recording disk glass substrate and a magnetic recording disk were obtained. However, as a result, a relatively small effect was obtained, compared with the sulfuric acid cleaning.

Examples 4-3 and 4-4

This is similar to the examples 1 and 2, except that a hydrogen peroxide of a concentration of 35 wt % is added to an acid. Thus a magnetic recording disk glass substrate and a magnetic recording disk were obtained.

The cleaning effect similar to that in the examples 4-1 and 4-2 was obtained by adding the hydrogen peroxide without externally heating an acid.

Examples 4-5 and 4-6

This is similar to the examples 1, except that a soda-lime glass (example 5) and a soda-aluminosilicate glass (example 6) are used instead of the aluminosilicate glass. Thus a magnetic recording disk glass substrate and a magnetic recording disk was obtained.

As a result, the compressed stress layer becomes shallow, compared with the aluminosilicate glass. However, there is no problem in practical use.

Example 4-7

An underlayer of Al (50 angstroms thick)/Cr (1000 angstroms)/CrMo (100 angstroms), a magnetic layer of CoPtCr (120 angstroms)/CrMo (50 angstroms)/CoPtCr (120 angstroms), and a Cr (50 angstroms) protection layer are formed on both surfaces of a magnetic recording disk glass substrate obtained in the example 4-1, using an in-line sputtering apparatus.

The above-described substrate is immersed into an organic silicon compound solution (being a mixed solution of water, IPA, and tetraethoxysilane) dispersed with silica fine particles (of a particle size of 100 angstroms), and then sintered so that a SiO2 protection layer is formed. Moreover, the protection layer is dipped into a lubricant of perfluoro polyether to form a lubricant layer. Thus a MR magnetic head is obtained.

The magnetic recording disk obtained was subjected to a gliding test. However, any hit or clash was not observed. It was confirmed that there is no defect in a film such as a magnetic layer.

Example 4-8

This is similar to the example 4-7, except that the underlayer is formed of Al/Cr/Cr and the magnetic layer is formed of CoNiCrTa. Thus a magnetic recording disk for a thin-film head was obtained. As to the magnetic recording disk, the result similar to that in the example 4-7 were confirmed.

Comparison Example

This is similar to the example 4-1, except that the glass substrate completely annealed is naturally cooled without rapidly cooling. Thus a magnetic recording disk glass substrate and a magnetic recording disk were obtained.

Like the example 4-1, the visual inspection is made to the magnetic recording disk glass substrate. As a result, it was observed that the surface has about 10 to 100 foreign matters.

The magnetic recording disks thus obtained are subjected to a gliding test. Hits (about 20%) and crushes were observed to the magnetic recording disks tested.

The present embodiment has been described with reference to preferable examples. The fourth embodiment should not be limited only to the above-described examples.

For example, a commercially available surface-active agent and a cleaning agent (including alkali cleaning agents) may be used in the cleaning step, instead of a neutral cleaning agent.

As described above, according to the glass substrate for an information recording disk manufacturing method of the fourth embodiment, since a glass substrate pulled up from the chemical reinforcement solution is cleaned with an acid containing cleaning agent, the deposit molten salt can be effectively removed without damaging the glass substrate.

Furthermore, according to the present invention of the fourth embodiment, since the deposit molten salt can be completed removed and a magnetic recording disk glass substrate with no minute flaws on the surface thereof is used, a high-quality magnetic recording disk with fewer defect can be manufactured at high yield.

We claim:

1. Glass substrate for an information recording disk manufacturing method comprising the step of:
   treating at least end side of a glass substrate with a treating solution containing a hydrofluosilicic acid.

2. Glass substrate for the information recording disk manufacturing method in accordance with claim 1, wherein said hydrofluosilicic acid has a concentration of 0.01 to 10 wt %.

3. Glass substrate for the information recording disk manufacturing method in accordance with claim 1, wherein said glass comprises an aluminosilicate glass or soda-lime glass.

4. Glass substrate for the information recording disk manufacturing method in accordance with claim 3, wherein said aluminosilicate glass comprises a chemical reinforced glass containing SiO2 of 62 to 75 wt %, Al2O3 of 5 to 15 wt %, Li2O of 4 to 10 wt %, Na2O of 4 to 12 wt %, and ZrO2 of 5.5 to 15 wt % as major components, Na2O/ZrO2 having a weight ratio of 0.5 to 2.0, Al2O3/ZrO2 having a weight ratio of 0.4 to 2.5.

5. Glass substrate for the information recording disk manufacturing method in accordance with claim 1, further comprising the post-step of:
   chemically strengthen the surface of said glass substrate using an ion exchanging method.

6. Glass substrate for an information recording disk manufacturing method comprising the step of:
   chemically strengthen a glass substrate by immersing said glass substrate in a chemical reinforcement solution heated and then ion exchanging ions on the surface portion of said glass substrate with ions in said chemical reinforcement solution;
   pulling up said substrate from said chemical reinforcement solution and then annealing it to a temperature higher than the crystallization temperature of a molten salt;
   annealing said glass substrate at a rate at which the crystallization of said molten salt is deposited on the surface of said glass substrate; and
   then cleaning the surface of said glass substrate.

7. Glass substrate for the information recording disk manufacturing method in accordance with claim 6, wherein said chemical reinforcement solution consists of a molten salt of any one of potassium nitride (KNO3), sodium nitride (NaNO3), potassium carbonate (K2CO3), NO3+NANO3, and KNO3+K2CO3, or a molten salt of a combination of the above-listed salts, or a molten salt made by mixing each of the above-listed salts with a salt of $Cu^+$, $Ag^+$, $Rb^+$, $Cs^+$, or the like.

8. Glass substrate for the information recording disk manufacturing method in accordance with claim 6, wherein said rate of rapidly cooling said glass substrate is 1600° C./min. to 200° C./min.

9. Glass substrate for the information recording disk manufacturing method in accordance with claim 6, wherein said chemically strengthen step comprises heating said chemical reinforcement solution to 350° C. to 650° C.; and wherein said step of annealing said glass substrate comprises pulling said glass substrate and then annealing the same to 300° C. to 350° C.; and wherein said step of rapidly cooling said glass substrate comprises rapidly cooling said glass substrate by contacting said glass substrate with cool medium.

10. Glass substrate for the information recording disk manufacturing method in accordance with claim 6, wherein said glass substrate comprises a glass substrate flattened according to the sheet glass flattening method defined by claim 1.

11. Glass substrate for the information recording disk manufacturing method in accordance with claim 6, wherein said glass substrate comprises an aluminosilicate glass, said aluminosilicate glass being a chemical reinforced glass containing SiO2 of 62 to 75 wt %, Al2O3 of 5 to 15 wt %, Li2O of 4 to 10 wt %, Na2O of 4 to 12 wt %, and ZrO2 of 5.5 to 15 wt % as major components, Na2O/ZrO2 having a weight ratio of 0.5 to 2.0, Al2O3/ZrO2 having a weight ratio of 0.4 to 2.5.

12. Glass substrate for an information recording disk manufacturing method comprising the steps of:

chemically strengthen a glass substrate by immersing said glass substrate in a chemical reinforcement solution heated and then ion exchanging ions on the surface layer of said glass substrate with ions in said chemical reinforcement solution; and pulling up said substrate from said chemical reinforcement solution and then cleaning the surface of said glass substrate with a cleaning agent containing acid.

13. Glass substrate for the information recording disk manufacturing method in accordance with claim 12, wherein said chemical reinforcement solution consists of a molten salt of any one of potassium nitride (KNO3), sodium nitride (NANO3), potassium carbonate (K2CO3), NO3+NANO3, and KNO3+K2CO3, or a molten salt of a combination of the above-listed salts, or a molten salt made by mixing each of the above-listed salts with a salt of $Cu^+$, $Ag^+$, $Rb^+$, $Cs^+$, or the like.

14. Glass substrate for the information recording disk manufacturing method in accordance with claim 12, wherein said cleaning agent containing acid is a cleaning agent containing sulfuric acid and/or phosphoric acid.

15. Glass substrate for the information recording disk manufacturing method in accordance with claim 14, wherein the concentration of said sulfuric acid is preferably 1 to 20 wt %, and is more preferably 2 to 10 wt %.

16. Glass substrate for the information recording disk manufacturing method in accordance with claim 12, wherein the heating temperature of said sulfuric acid is 40° to 100° C.

17. Glass substrate for the information recording disk manufacturing method in accordance with claim 12, further comprising the steps of:

chemically strengthen said glass substrate by heating said chemical reinforcement substrate at a temperature higher than the melting point of a salt;

rapidly cooling said glass substrate; and then cleaning said glass substrate.

18. Glass substrate for the information recording disk manufacturing method in accordance with claim 17, wherein said glass substrate comprises an aluminosilicate glass, said aluminosilicate glass being a chemical reinforced glass containing SiO2 of 62 to 75 wt %, Al2O3 of 5 to 15 wt %, Li2O of 4 to 10 wt %, Na2O of 4 to 12 wt %, and ZrO2 of 5.5 to 15 wt % as major components, Na2O/ZrO2 having a weight ratio of 0.5 to 2.0, Al2O3/ZrO2 having a weight ratio of 0.4 to 2.5.

19. Glass substrate for the information recording disk manufacturing method in accordance with claim 12, wherein said glass substrate comprises a glass substrate flattened according to the sheet glass flattening method defined by claim 1.

* * * * *